Jan. 19, 1932.    G. C. TAYLOR    1,841,425
BACK PRESSURE TURBINE CONTROL MECHANISM
Filed Oct. 18, 1929
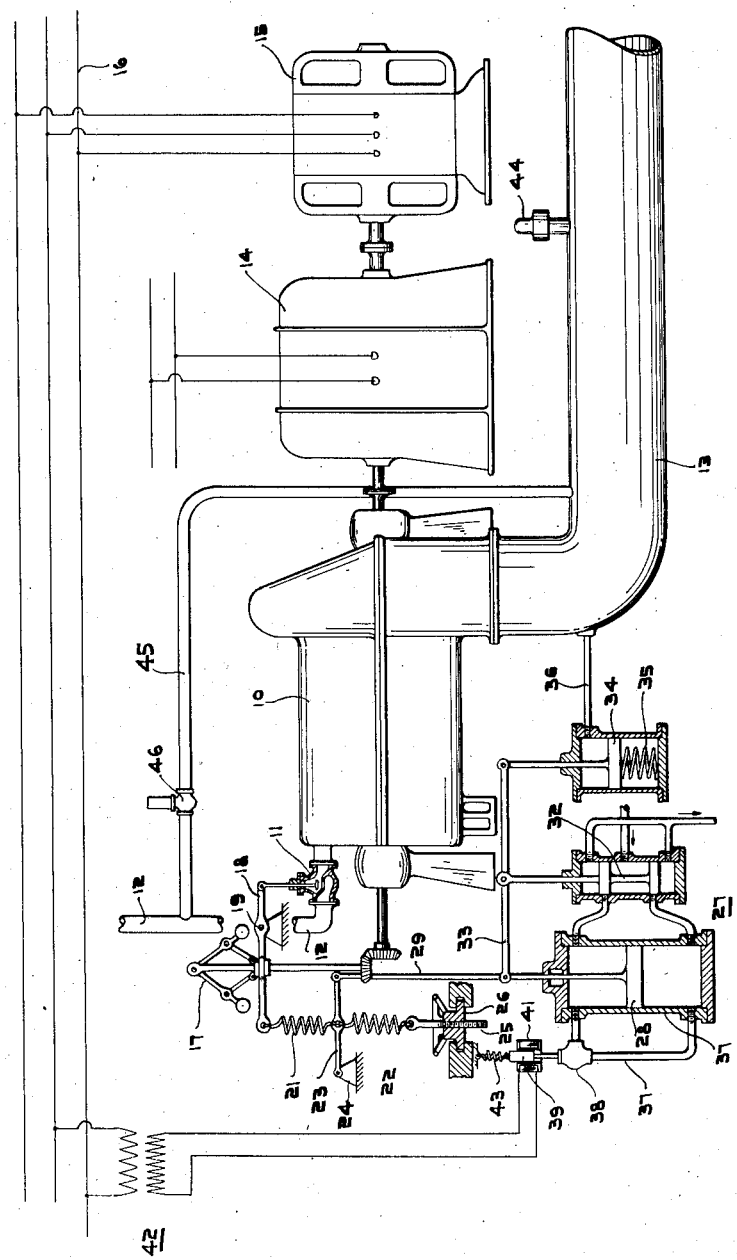
WITNESS
E. Lutz.
INVENTOR
G. C. Taylor.
BY
A. B. Reavis
ATTORNEY Patented Jan. 19, 1932

1,841,425

UNITED STATES PATENT OFFICE

GEORGE C. TAYLOR, OF BROOKLINE, MASSACHUSETTS, ASSIGNOR TO WESTINGHOUSE ELECTRIC & MANUFACTURING COMPANY, A CORPORATION OF PENNSYLVANIA

BACK PRESSURE TURBINE CONTROL MECHANISM

Application filed October 18, 1929. Serial No. 400,666.

My invention relates to a regulating mechanism for a prime mover, more particularly to a regulating mechanism for an elastic fluid turbine used for developing power and also performing some auxiliary function such as supplying partially expanded motive fluid, the speed of the turbine being normally controlled by mechanical or electrical connection with other apparatus and the admission of motive fluid to the turbine being normally controlled in response to demand for the auxiliary function, such as the demand for partially expanded motive fluid.

The object of the invention is to provide a regulating mechanism for a turbine of the character set forth which will normally control the admission in accordance with the demand for the auxiliary function but which, upon failure of the speed controlling connection, will change to speed responsive control, whereby the speed of the turbine will not be substantially affected by failure of the machine normally controlling the speed thereof, or failure of its connection therewith.
Elastic fluid turbines which develop power and at the same time supply partially expanded motive fluid have come into general use. The supply of motive fluid to such turbines is usually controlled in response to the demand for partially expanded motive fluid, and in order to provide for variations between the demand for power and the amount of power developed by the steam flowing through the turbine to supply the demand for partially expanded motive fluid, the turbine is connected with another source of power, as by driving a generator tied in on an electric line or by being coupled to a motor, such as an alternating current synchronous motor, which is tied in on an electric line.

In some power plants, such as in paper mills, a continuity of power is of very great importance, and when the outside source of power fails, it becomes necessary for the turbine to assume the entire power load, the pressure of the partially expanded motive fluid being permitted to fluctuate for the time being. In such cases, it is important that the speed of the turbine be maintained in order to maintain an even speed of the paper machine motors.

In accordance with my invention, I provide a governor for the admission valve which is responsive to the speed of the turbine and I adjust the speed setting to the desired normal operating speed which is determined by the outside source of power. I then provide other mechanism for modifying the action of the speed responsive governor in accordance with the demands for partially expanded motive fluid, and I further provide a device for rendering the last-mentioned mechanism inoperative when the outside source of power fails so that the governor is free to control the same within the small governing range determined by the setting, which is substantially the speed determined by the outside power source. In this way, the speed of the turbine is substantially unaffected by failure of the outside power source.

The above and other objects are obtained by my invention, as will be apparent from the following description and claims taken in connection with the accompanying drawing, forming a part of this application, in which:

The single figure is a diagrammatic view of regulating mechanism in accordance with my invention applied to an elastic fluid turbine.

Referring to the drawing more in detail, I show an elastic fluid turbine 10, having an admission valve 11 through which motive fluid is admitted from a supply conduit 12, and discharging to a conduit 13 which supplies apparatus requiring partially expanded motive fluid. The turbine 10 is mechanically coupled to a driven machine, for example, a direct current generator 14 and to an alternating current synchronous motor 15, which is also capable of acting as a generator and which is electrically connected with an electric power line 16 supplied with electric power from any suitable source, and which for convenience I term the outside power source. The direct current generator 14 is representative of any driven machine for the purposes of the present invention.

A speed governor 17, which is responsive to the speed of the turbine 10, is connected to the admission valve 11 by means of a lever 18 which is pivoted on a stationary fulcrum 19. In the present case, I show the governor 17 as of a conventional fly-ball type, although any other suitable form of governor may be used. The governing force of the fly-balls is opposed by two springs 21 and 22, which are connected in end-to-end relation by means of a lever 23 pivoted to a stationary fulcrum 24.

As will be apparent, as long as the lever 23 is free to float, the two springs constitute, in effect, a single spring acting on the lever 18. The end of the spring 22 remote from the lever 23 is provided with an adjustment for varying the initial deflection of the springs. In the present case, this adjustment consists of screws threads on a spring-holding stem 25 and a hand wheel 26 screw threaded thereon. As will be apparent the initial deflection of the springs may be varied or adjusted by turning the handle at 26.

The governor as so far described, assuming the lever 23 free to float, actuates the admission valve 11 in response to the speed of the prime mover. Upon increase in speed, the fly-balls fly outwardly and upwardly, raising the left end of the lever 18 against the force of the springs 21 and 22 and moving the admission valve 11 in closing direction. Upon decrease in speed, the governor moves in the opposite direction.

The hand wheel 26 is preferably adjusted to provide the speed at which the outside power source operates the alternating current motor 15.

In order to regulate the admission during normal operation to supply the demand for partially expanded motive fluid in the conduit 13, I provide the fluid pressure relay 27 which is actuated in response to the pressure in the conduit 13. The relay 27 includes an operating piston 28 connected to the free end of the lever 23 by means of a rod 29 and disposed in a cylinder 31. The admission of motivating fluid pressure to and discharge of fluid from the cylinder 31 is controlled by a pilot valve 32 in the manner of a conventional fluid pressure relay, as is well known in the art and apparent from the drawing and need not here be further described in detail. The pilot valve 32 is operated by a floating lever 33 connected at one end to the rod 29 and at its other end to a piston 34. The latter is biased upwardly by a spring 35 and subjected in downward direction to the pressure in the conduit 13 communicated through a conduit 36.

This relay practically supersedes the speed responsive action of the governor, particularly in view of the fact that as long as the motor 15 is connected with the outside source of power, the variation in speed is small and cannot be affected by change in position of the governor valve 11. The relay mechanism modifies the action of the governor in the following manner:

Upon an increase in demand for fluid in the conduit 13, the pressure therein decreases, permitting the spring 35 to move the piston 34 upwardly. The pilot valve 32 thereupon admits fluid pressure to the upper end of the cylinder 31 to move the piston 28 and the lever 23 downwardly, the pilot valve 32 being restored to normal cut off position by the lever 33.

The downward movement of the lever 23 increases the tension of the spring 21 and hence the lever 18 moves the admission valve 11 in opening direction to supply the additional amount of motive fluid required to be admitted to the turbine to supply the demand in the conduit 13. In this operation, the spring 22 is not effective, the position of the lower end of the spring 21 being determined entirely by the lever 23.

Upon a decrease in demand for fluid in the conduit 13, the pressure thereof increases, moving the piston 34 downwardly. The pilot valve 32 thereupon admits fluid pressure to the lower end of the cylinder 31, resulting in upward movement of the piston 28 and the lever 23. The tension of the spring 21 is decreased, and the force of the fly-balls moves the left end of the lever 18 upwardly and the admission valve 11 in closing direction.

In order to render the pressure control inoperative in case of failure of power supplied to the electric power line 16, I provide the following additional mechanism. A by-pass 37 is provided in the relay and adapted to provide communication between the opposite ends of the cylinder 31, that is, on opposite sides of the piston 28. A valve 38 is provided in the by-pass 37 which is connected to and operated by an iron core 39 disposed in a solenoid 41. The solenoid 41 is supplied with current from the power line 16 through a transformer 42 as long as there is a supply of electric power in the line 16. The iron core 39 is disposed within the solenoid so as to be biased downwardly to close the valve 38 when the solenoid 41 is energized. A spring 43 biases the core 39 upwardly to open the valve 38 when the solenoid 41 is not energized. Thus, as long as the supply of outside electric power is available, the valve 38 is shut and the relay 27 is operative as above described.

During normal operation of the above described apparatus, the speed of the three unit set is determined by the frequency of the alternating current supplied to the motor 15, as is well understood in the art. The generator 14 supplies direct current for driving the various motors in the plant. The turbine 10 acts as a reducing valve in reducing high pressure motive fluid to the pressure required in the conduit 13 and extracts power therefrom in so reducing the pressure. The amount of power developed by expanding the required amount of motive fluid is available for driving the generator 14, and any further power required is supplied by the motor 15. When the power delivered by the turbine 10 exceeds the power required by the generator 14, the motor 15 functions as a generator and transmits the excess of power into the electric line 16, as is well understood.

It is very important that the speed of the direct current generator 14 be maintained substantially uniform, in order that the speed of the motors driven by current supplied therefrom be maintained substantially uniform. Inasmuch as it is unlikely that the power developed by the turbine 10 be equal to the power required by the generator 14, it is apparent that should the outside source of power fail, there would be an immediate departure in the speed of the set from the desired operating speed. To avoid such a departure from the desired operating speed, the last described mechanism operates as follows:

The failure of electric power in the line 16 deenergizes the solenoid 41 permitting the spring 43 to open the valve 38 in the by-pass 37. The piston 28 is thus free to float up and down, even though fluid be admitted by the pilot valve 32 to the upper and lower ends thereof for the reason that fluid can readily flow from one end to the other through the by-pass 37. The lever 23 is thus free to float between the springs 21 and 22, and the latter thereupon provides a governing scale, constituting, in effect, a single spring. The governor 17 now operates in the manner of an ordinary speed responsive governor, controlling the admission valve 11 to provide a fluid admission which maintains the speed of the turbine 10 within close limits of the normal operating speed. The turbine supplies the requisite power required by the generator 14, without regard to the amount of the partially expanded fluid required in the conduit 13.

In order to provide for the variation in supply and demand for partially expanded motive fluid, the following additions are preferably made: A pressure relief valve 44 is provided for discharging the excess motive fluid in case more motive fluid is required for power development than is required for fluid demand. A by-pass 45 is provided between the high pressure conduit 12 and the conduit 13 and a reducing valve 46 is provided therein. The reducing valve 46 is set to open at a pressure slightly below the minimum pressure normally provided by the back pressure control mechanism. If the power required by the generator 14 fails to supply the required amount of fluid to the conduit 13, the pressure therein decreases, and the reducing valve 46 opens to admit fluid pressure from the conduit 12 to the conduit 13, at the same time expanding and reducing the pressure thereof substantially to that required in the conduit 13.

From the above description, it will be seen that I have provided a back pressure control which normally controls the admission of motive fluid to the turbine in accordance with the back pressure, and which automatically and immediately controls the admission in accordance with the speed to maintain the same constant speed in case of a failure of the outside power source.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a three-unit set comprising a turbine, a synchronous electrical machine connected to an alternating current power line, and a driven machine all connected together, of means controlling the admission of motive fluid to said turbine comprising a governor responsive to the speed thereof, means for adjusting the speed setting thereof, means responsive to the pressure of fluid exhausted by said turbine for modifying the action of said governor without affecting the adjusting means, and means responsive to failure of current in said power line for rendering the pressure-responsive means inoperative, whereupon said governor controls the admission of motive fluid to the turbine in response to the speed thereof to maintain the same substantially constant.

2. The combination with a three-unit set comprising a turbine, a synchronous electrical machine connected to an alternating current power line, and a driven machine all connected together, of means for controlling the admission of motive fluid to the turbine comprising a governor responsive to the speed of the turbine, means for adjusting the speed setting of the governor, a fluid pressure relay having an operating piston connected to the governor to modify the action thereof without affecting the speed setting, means for controlling the relay in response to an operating condition of the turbine other than the speed thereof, a by-pass adapted to provide communication in the relay between opposite sides of the operating piston, a valve in said by-pass, and means responsive to failure of electric current in said power line for opening said valve, whereupon said relay is inoperative to affect the operation of the speed governor and the latter thereupon controls the admission of motive fluid to the turbine to maintain the speed thereof in accordance with its speed setting adjustment.

3. The combination with a turbine driven set comprising an elastic fluid turbine and an electric machine connected thereto, of means for controlling the admission of motive fluid to the turbine comprising a governor responsive to the speed of the turbine, means for adjusting the speed setting of the governor, a fluid pressure relay having an operating piston connected to the governor and capable of modifying the action thereof without affecting the speed setting adjustment, and means responsive to an operating condition of the set for providing communication in the relay between opposite sides of the operating piston, whereupon said piston is free to float and permit the governor to control the admission of motive fluid in accordance with the speed setting adjustment.

4. The combination with a turbine driven set comprising an elastic fluid turbine and an electric machine connected thereto, the turbine having an admission valve and exhausting at a back pressure, of governing means for said admission valve including a speed governor connected thereto, means for adjusting the setting of the governor, means responsive to the back pressure for either increasing or decreasing the fluid-admitting action of the governor without changing the adjustment thereof, and means responsive to an abnormal operating condition of the set for rendering the last-named means inoperative, whereupon the governor controls the admission valve in accordance with the adjustment and in response to the speed of the turbine.

5. The combination with an elastic fluid turbine having an admission valve and exhausting at a back pressure, a machine connected thereto and driven thereby, and an electric machine also connected to the turbine and determining the speed of said turbine and machines, governing means for said turbine including a speed governor controlling the admission valve, means for adjusting the speed setting of the governor, means responsive to the back pressure for modifying the action of the governor without changing the speed setting adjustment, and means responsive to failure of the electric machine to determine the speed of the turbine and machines for rendering the last-named means inoperative, whereupon the speed governor controls the admission valve to maintain the speed of the turbine within the range determined by the speed setting adjustment.

6. The combination with an elastic fluid turbine and a synchronous alternating current motor controlling the speed thereof, of means for regulating the admission of motive fluid to the turbine comprising a governor responsive to the speed of the turbine and adapted to control the admission, adjustment means for varying the speed setting of the governor, means responsive to an operating condition other than the speed and effective normally to supersede substantially the control of the governor and to control the admission in response to said other operating condition without moving said adjustment means, and means responsive to failure of the motor to control the speed whereby the last-named means is rendered inoperative and the governor is rendered effective to govern at the speed setting to which said adjustment means has been set.

In testimony whereof, I have hereunto subscribed my name this eighth day of October, 1929.

GEORGE C. TAYLOR.